Jan. 25, 1927.
E. A. WATTS
1,615,249
MIXTURE VALVE FOR GAS ENGINES
Filed Oct. 23, 1924  2 Sheets-Sheet 2
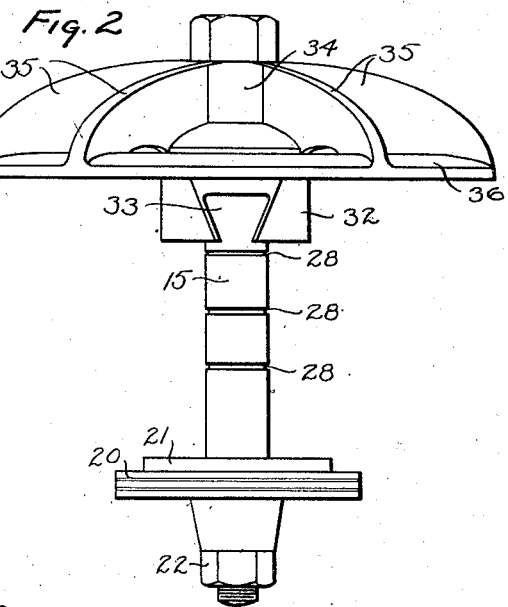
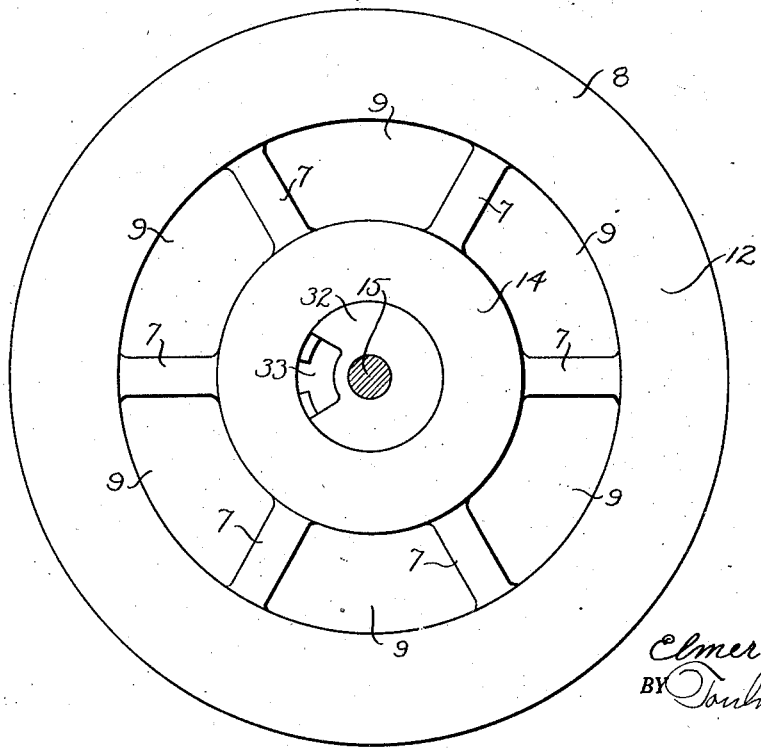
INVENTOR.
Elmer A. Watts
BY
ATTORNEYS.

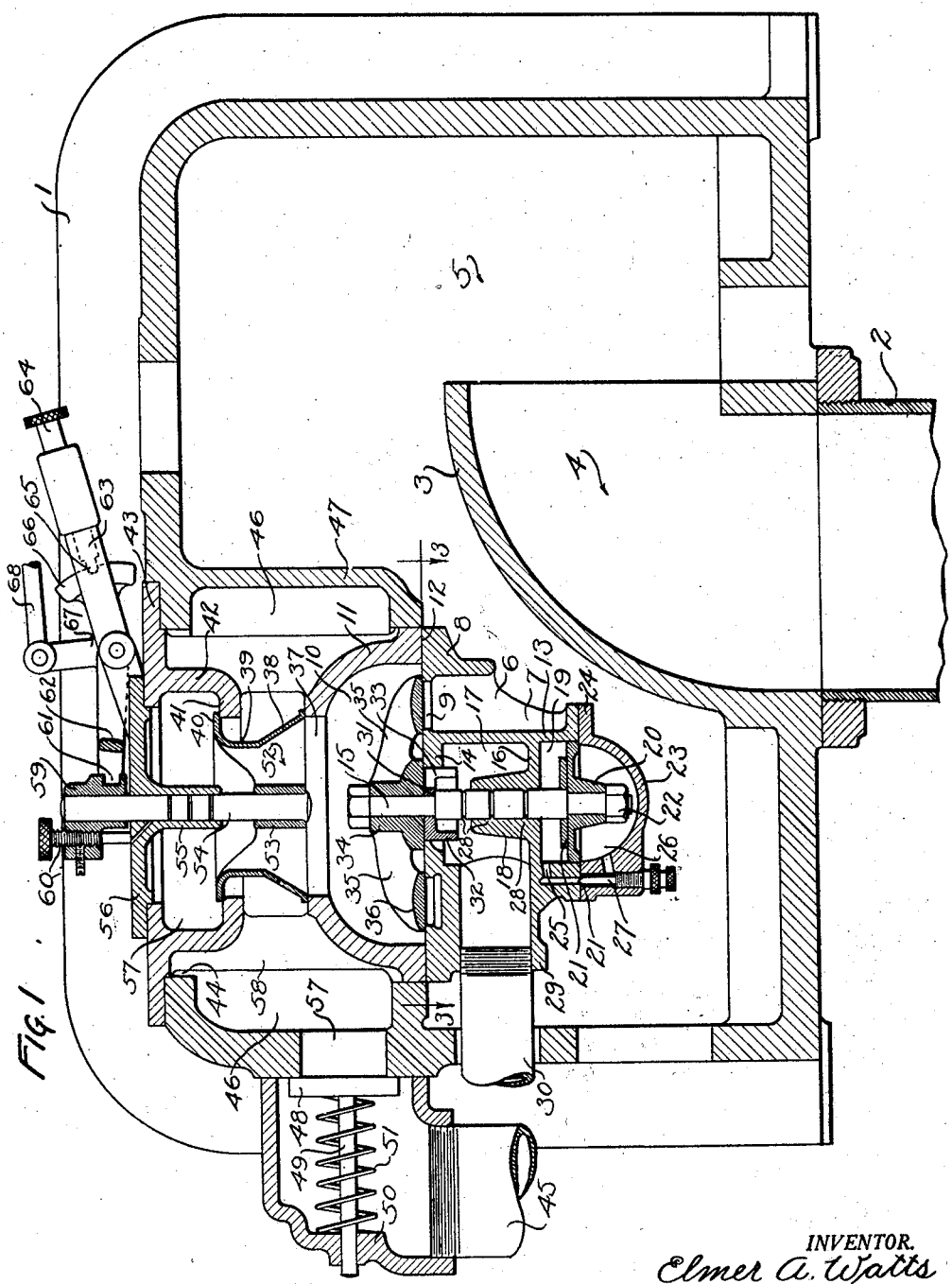

Patented Jan. 25, 1927.

1,615,249

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

MIXTURE VALVE FOR GAS ENGINES.

Application filed October 23, 1924. Serial No. 745,337.

My invention relates to mixing valves for internal combustion engines.

It is my object to provide a mixing valve in which the greater the load the greater the proportion of air to the fuel, that is, more air is admitted than gas as the load increases.

It is the object of my invention to provide a valve mechanism which will not flutter, but which will steadily and gradually operate to deliver the requisite amount of fuel to the engine depending upon the load and speed.

It is a further object of my invention to provide such a mixing valve connected to the governor of the engine and to arrange it so that the valve may be operated independently of the governor.

It is a further object to provide a balanced valve construction for mixing and throttling purposes.

It is another object of my invention to provide a mixing valve construction which may be installed as a unit in the frame of the engine and which may be removed as a unit for adjustment and repair.

It is a further object to provide a valve mechanism in which there is a dash pot construction which may be regulated in its operation after the valve construction has been installed.

Referring to the drawings:

Figure 1 is a section through the engine casing and valve mechanism;

Figure 2 is a side elevation of the gas inlet valve member showing its progressive opening;

Figure 3 is a section on the line 3—3 of Figure 1, showing the arrangement of openings for the gas and air into the primary mixing chamber.

Referring to the drawings, in detail, 1 is the main casing of the engine which is formed with an air inlet pipe 2 in one wall. This pipe communicates with a right angle tubular structure 3 which is integral with the casing 1 and forms a conduit for the incoming air through the passageway 4. This passageway 4 communicates with the interior 5 of the casing 1. The air is then drawn through the passageway which is formed between the rib 7 of a housing or spider 8 through opening 9 into the primary mixing chamber 10. This mixing chamber is formed by a dome-like structure 11, the base of which is joined to the ring of the spider 8 which is designated 12. It is within this ring which is supported by the rib 6 that are found the apertures 9 through which the air enters into the primary mixing chamber. This ring 8 and the ribs 6 are held together with a hub structure 13 which is cylindrical. This hub structure is composed of a cap member 14 which forms the inner wall of the apertures 9. It also forms the upper guide for the valve stem 15. There is a transverse partition 16 carried in this hub separated from the top wall 4 and forming a gas chamber 17. This cross-wall 16 is extended upwardly into a tapered sleeve 18 forming a lower or intermediate guide for the valve stem 15. Below the partition 16 is the upper dash pot chamber 19. In this chamber, using the walls of the hub 13 as cylinder walls, is a piston head of the dash pot designated 20. This piston head is carried on the lower end of the valve stem 15 between a shoulder thereon and a nut 22 which is threaded on the lower end of the valve stem. Enclosing the lower end of the valve stem and the dash pot piston 20 is a cup shaped casing 23 having upper flanges 24 engaging with corresponding flanges on the bottom of the cylindrical member 13.

The passageway 25 is formed in the walls of the casing 13 and cup 23 connecting the upper chamber 19 above the piston 20 and the lower chamber 26 below the piston 20 within the cup 23. A needle valve 27 is carried in the wall of the cup controlling the passage of air from one side of the piston to the other to regulate the descent of the piston.

The valve stem is provided with grooves 28 for containing oil for lubricating purposes.

One wall of the cylindrical member 13 is formed into a pipe structure 29 which communicates with the interior of a cylinder and the compartment 17. Threaded into this pipe portion of the casing 13 is the feed pipe 30 through which fuel is fed into the chamber 17.

The upper end of the valve stem 15 is formed with a shoulder 31 upon which sits a cup like valve 32 having a V-shaped portion cut away at 33, the bottom being upwardly disposed so that as the valve is lifted a progressively smaller amount of gas in proportion to the air will be admitted to the primary mixing chamber. Resting on this inverted cup valve member 32 is a hub 34 of a spider and a plurality of arms 35 and a ring joining the arms on the outer ends thereof, designated 36 which ring covers and closes the openings 9 through which the air enters the primary mixing chamber.

The upper end of this primary mixing chamber formed by the inverted cup shaped casting 11 is open as at 37. Resting on the upper outer wall of this opening 37 is a throttling valve consisting of an inwardly extending wall 38 and an upwardly extending wall 39 which is turned over to form a ledge as at 40 for resting on an inwardly turned flange 41 of a collar 42, which collar is connected to an annular casing 43 which rests upon the upper portion of the casing 1 adjacent the opening 44 through which the entire valve mechanism is lowered into position.

Surrounding the primary mixing chamber 11, the throttling valve and the annular member 42, is a chamber for receiving the mixed gases on their way through the pipe 45. This chamber is designated 46 and is formed by a partially annular casting 47 formed as the portion of the ring, the other portion of the wall thereof being formed by the outside casting 1. This chamber is provided with an exit port 57 which is closed by a spring-pressed valve 48 having a valve stem 49 working in a wall 50 into which the exit pipe 45 is threaded. A spring 51 tends to keep this valve seated.

The throttling valve is supported on a series of spider arms 52 carried on the head 53 which in turn is mounted on a valve stem 54. This stem is supported by and guided by a sleeve 55 depending from a cap plate 56 resting on top of the annular casting 43 and closing the opening above the throttling valve. A chamber 57 is located above the valve beneath the plate 56 and within the walls of the annular chamber 42. A series of ribs 58 connect the annular member 42 to the inverted cup-shaped primary mixing chamber 11.

The upper end of the valve stem 54 has a collar 59 mounted thereon carrying a set screw for limiting its exact position and the extent of its movement. Engaging with this collar is a pair of jaws 61 on an arm 62. This arm has at its outer end an outwardly and upwardly extending arm 63 carrying a spring-pressed plunger 64 which has a detent 65 working in the rack or segment 66. The purpose of this arm is to operate the throttling valve independently of the governor upon withdrawing the detent 65 from the segment 66 which is carried on a bell crank 67 to which is attached the governor by the rod 68.

*Operation.*—The air is admitted to the passageway 4 to the chamber 5, and thence through the air passageway which has openings 9 beneath the mixing valve 36, into the primary mixing chamber where it meets the gas coming through the opening 33 of the valve 32 from the gas chamber 17.

It will be observed that the greater the load the higher the spider 35 will lift, thereby giving a greater supply of air in direct proportion to the amount of load. This gives a greater proportion of air to gas under a heavier load than under a lighter load, the proportion being preferably one part of gas to twenty of air at maximum of load as compared to one part of gas to twelve of air at minimum of load. This proportion is due to the fact that the valve opening 33 is so arranged that the higher the speed the higher it is lifted for the admission of a greater amount of air, a smaller amount of gas being admitted to the primary mixing chamber 10.

The amount of mixed, carbureted fuel admitted to the engine is determined by the throttling valve which is connected to the governor.

It is thus possible by this apparatus to throttle the engine despite its great size and power which is characteristic of the engine to which I have applied this apparatus to a minimum speed without missing as the proportion of the fuel and the air is mixed in proportion to the load and properly carbureted.

The dash pot prevents the valve from fluttering and provides an even and gradual movement of the valve parts to give a smooth performance to the engine.

The exact action of this dash pot must be adjusted through the set screw of the needle valve 27.

It will be understood that I desire to comprehend within my invention such modifications as may be necessary to adapt it to varying conditions of use.

Having thus fully described my invention, what I claim as new and desire to secure by Letters Patent, is:—

1. In an internal combustion engine, a mixing valve apparatus consisting of air and gas intake passageways, a mixing chamber, means to permit of the entrance of the air into the mixing chamber in proportion to the load, and means to decrease the amount of gas in proportion to the amount of air admitted to the mixing chamber as the load increases.

2. In an internal combustion engine, a mixing valve apparatus consisting of a mixing chamber, means of delivering gas thereto, means of delivering air thereto, means of controlling the entrance of air and gas thereto so that the air increases directly in proportion to the load and the gas supply decreases as the load increases in proportion to the amount of air delivered, and a dash pot regulator for controlling the movement of the means for admitting the air and gas.

3. In an internal combustion engine, a mixing valve apparatus consisting of a mixing chamber having means to admit air thereto, a valve member for controlling the admission of air thereto, a cooperating valve member for admitting gas thereto, means to supply gas to said mixing chamber, said valves being carried on a common valve stem and operating together, said gas valve being progressively cut away with the larger portion of the opening through the valve at the top thereof, whereby as the valves lift the air will increase in proportion to the amount of gas admitted.

4. In an internal combustion engine, a mixing valve apparatus consisting of a mixing chamber having means to admit air thereto, a valve member for controlling the admission of air thereto, a cooperating valve member for admitting gas thereto, means to supply gas to said mixing chamber, said valves being carried on a common valve stem and operating together, said gas valve being progressively cut away with the larger portion of the opening through the valve at the top thereof, whereby as the valves lift the air will increase in proportion to the amount of gas admitted, and a throttling valve controlling the exit of carbureted fuel from the mixing chamber, adapted to lift in proportion to the speed of the engine.

5. In an internal combustion engine, a primary mixing chamber, a structure closing one wall thereof having ports therethrough arranged in annular formation for the passage of air into the chamber, a fuel delivery chamber in said structure having a centrally arranged port for introducing fuel into the mixing chamber, a ring valve connected by arms to a valve stem for closing the air ports, a piston valve having a progressive opening carried on the same valve stem for controlling the fuel port, whereby the two valves will move in unison.

6. In an internal combustion engine, a primary mixing chamber, a structure closing one wall thereof having ports therethrough arranged in annular formation for the passage of air into the chamber, a fuel delivery chamber in said structure having a centrally arranged port for introducing fuel into the mixing chamber, a ring valve connected by arms to a valve stem for closing the air ports, a piston valve having a progressive opening carried on the same valve stem for controlling the fuel port, whereby the two valves will move in unison, the cut away portion of the fuel valve being larger at the top than at the bottom so as to progress the amount of fuel in proportion to the amount of air as the valves in increase in lift.

7. In an internal combustion engine, a primary mixing chamber, a structure closing one wall thereof having ports therethrough arranged in annular formation for the passage of air into the chamber, a fuel delivery chamber in said structure having a centrally arranged port for introducing fuel into the mixing chamber, a ring valve connected by arms to a valve stem for closing the air ports, a piston valve having a progressive opening carried on the same valve stem for controlling the fuel port, whereby the two valves will move in unison, the cut away portion of the fuel valve being larger at the top than at the bottom so as to progress the amount of fuel in proportion to the amount of air as the valves increase in lift, and a dash pot chamber formed in said structure, a dash pot piston on the lower end of said valve stem working in said chamber, whereby the movement of the valves may be regulated.

8. In an internal combustion engine, a primary mixing chamber, a structure closing one wall thereof having ports therethrough arranged in annular formation for the passage of air into the chamber, a fuel delivery chamber in said structure having a centrally arranged port for introducing fuel into the mixing chamber, a ring valve connected by arms to a valve stem for closing the air ports, a piston valve having a progressive opening carried on the same valve stem for controlling the fuel port, whereby the two valves will move in unison, the cut away portion of the fuel valve being larger at the top than at the bottom so as to progress the amount of fuel in proportion to the amount of air as the valves increase in lift, and a passageway joining the respective sides of the chamber divided by the dash pot piston, and a needle valve for controlling the passage of air therethrough to regulate the action of the dash pot.

9. In an internal combustion engine, a mixing valve construction consisting of a fuel chamber, a supply pipe connected thereto, an exit port at the top thereof, a cup shaped valve working in said exit port having an opening cut in the side thereof which is progressively smaller from the top to the bottom, a valve stem supporting said valve, a sleeve in said chamber guiding said valve stem, a plurality of arms radiating from the exterior of said chamber supporting a ring, the spaces between the chamber and the ring and arms forming air ports, a ring valve adapted to close said air ports, a series of arms joining said ring to said valve stem, and means to embrace said arms on said valve stem between the gas valve and the top of said valve stem, and a mixing chamber casing mounted on said ring having an exit opening at the top thereof above said valves, and a throttling valve mounted to control the exit of carbureted fuel through said mixing chamber opening.

10. In an internal combustion engine, a mixing valve construction consisting of a fuel chamber, a supply pipe connected thereto, an exit port at the top thereof, a cup shaped valve working in said exit port having an opening cut in the side thereof which is progressively smaller from the top to the bottom, a valve stem supporting said valve, a sleeve in said chamber guiding said valve stem, a plurality of arms radiating from the exterior of said chamber supporting a ring, the spaces between the chamber and the ring and arms forming air ports, a ring valve adapted to close said air ports, a series of arms joining said ring to said valve stem, means to embrace said arms on said valve stem between the gas valve and the top of said valve stem, a mixing chamber casing mounted on said ring having an exit opening at the top thereof above said valves, and a throttling valve mounted to control the exit of carbureted fuel through said mixing chamber opening, and an annular exit manifold for the carbureted fuel around said throttling valve.

11. In an internal combustion engine, a mixing valve construction consisting of a fuel chamber, a supply pipe connected thereto, an exit port at the top thereof, a cup shaped valve working in said exit port having an opening cut in the side thereof which is progressively smaller from the top to the bottom, a valve stem supporting said valve, a sleeve in said chamber guiding said valve stem, a plurality of arms radiating from the exterior of said chamber supporting a ring, the spaces between the chamber and the ring and arms forming air ports, a ring valve adapted to close said air ports, a series of arms joining the ring to said valve stem, means to embrace said arms on said valve stem between the gas valve and the top of said valve stem, a mixing chamber casing mounted on said ring having an exit opening at the top thereof above said valves, a throttling valve mounted to control the exit of carbureted fuel through said mixing chamber opening, an annular exit manifold for the carbureted fuel around said throttling valve, and an intake valve normally spring-pressed to closed position for controlling the exit of the carbureted fuel from the manifold to the engine.

12. In an internal combustion engine, a mixing valve construction consisting of a fuel chamber, a supply pipe connected thereto, an exit port at the top thereof, a cup shaped valve working in said exit port having an opening cut in the side thereof which is progressively smaller from the top to the bottom, a valve stem supporting said valve, a sleeve in said chamber guiding said valve stem, a plurality of arms radiating from the exterior of said chamber supporting a ring, the spaces between the chamber and the ring and arms forming air ports, a ring valve adapted to close said air ports, a series of arms joining the ring to said valve stem, means to embrace said arms on said valve stem between the gas valve and the top of said valve stem, a mixing chamber casing mounted on said ring having an exit opening at the top thereof above said valves, a throttling valve mounted to control the exit of carbureted fuel through said mixing chamber opening, an annular exit manifold for the carbureted fuel around said throttling valve, an intake valve normally spring-pressed to closed position for controlling the exit of the carbureted fuel from the manifold to the engine, and a governor connected to said throttling valve.

13. In an internal combustion engine, a mixing valve construction consisting of a fuel chamber, a supply pipe connected thereto, an exit port at the top thereof, a cup shaped valve working in said exit port having an opening cut in the side thereof which is progressively smaller from the top to the bottom, a valve stem supporting said valve, a sleeve in said chamber guiding said valve stem, a plurality of arms radiating from the exterior of said chamber supporting a ring, the spaces between the chamber and the ring and arms forming air ports, a ring valve adapted to close said air ports, a series of arms joining the ring to said valve stem, means to embrace said arms on said valve stem between the gas valve and the top of said valve stem, a mixing chamber casing mounted on said ring having an exit opening at the top thereof above said valves, a throttling valve mounted to control the exit of carbureted fuel through said mixing chamber opening, an annular exit manifold for the carbureted fuel around said throttling valve, an intake valve normally spring-pressed to closed position for controlling the exit of the carbureted fuel from the manifold to the engine, and a governor connected to said throttling valve, and a dash pot connected to said gas and air valves for regulating their movement.

14. In an internal combustion engine, apparatus for carbureting fuel consisting of a casing to form an incoming fuel chamber, a valve therein having a progressive opening, a plurality of arms carrying a ring spaced from said fuel chamber, said arms being mounted on the chamber, a ring valve adapted to close the openings between the ring and the fuel chamber and operating with the fuel valve, a mixing valve casing of the same diameter as the ring, a plurality of upstanding ribs on the exterior of said mixing valve chamber, a cup shaped structure carried thereby having a flange projecting beyond the diameter of the other parts, a main casing adapted to support said structure by said flange having an aperture through said casing in which the complete structure may be inserted, a spaced wall about said primary mixing chamber, a cup to form an exit manifold, a throttle valve mounted in said cup and manifold and upon said primary mixing chamber to regulate the exit of the fuel to the manifold, and an exit pipe for the fuel connected to said manifold.

15. In an internal combustion engine, apparatus for carbureting fuel consisting of a casing to form an incoming fuel chamber, a valve therein having a progressive opening, a plurality of arms carrying a ring spaced from said fuel chamber, said arms being mounted on the chamber, a ring valve adapted to close the openings between the ring and the fuel chamber and operating with the fuel valve, a mixing valve casing of the same diameter as the ring, a plurality of upstanding ribs on the exterior of said mixing valve chamber, a cup shaped structure carried thereby having a flange projecting beyond the diameter of the other parts, a main casing adapted to support said structure by said flange having an aperture through said casing in which the complete structure may be inserted, a spaced wall about said primary mixing chamber, a cup to form an exit manifold, a throttle valve mounted in said cup and manifold and upon said primary mixing chamber to regulate the exit of the fuel to the manifold, an exit pipe for the fuel connected to said manifold, and a dash pot formed in the base of the structure composing the fuel chamber, a dash pot piston on the valve stem carrying the fuel and air valves, and means for regulating said dash pot movement.

16. In a throttle valve, means for admitting air and fuel to a primary mixing chamber, a primary mixing chamber having an exit port therethrough, a throttling valve consisting of a cup resting on top of said chamber having an inwardly extending portion and an upwardly extending throat with an overturned flange resting upon the bottom of a cup shaped structure forming a chamber above the valve, said valve having passageways therethrough for communication between said valve and said mixing chamber, a manifold around said throttling valve and chambers, whereby as the valve lifts the fuel which is carbureted may make its exit from the manifold, and a governor connected to said throttling valve.

In testimony whereof, I affix my signature.

ELMER A. WATTS.